Aug. 10, 1937.   W. W. TURNBULL   2,089,675
CUP PASTRY BAKING MACHINE
Filed Feb. 17, 1937   2 Sheets-Sheet 2
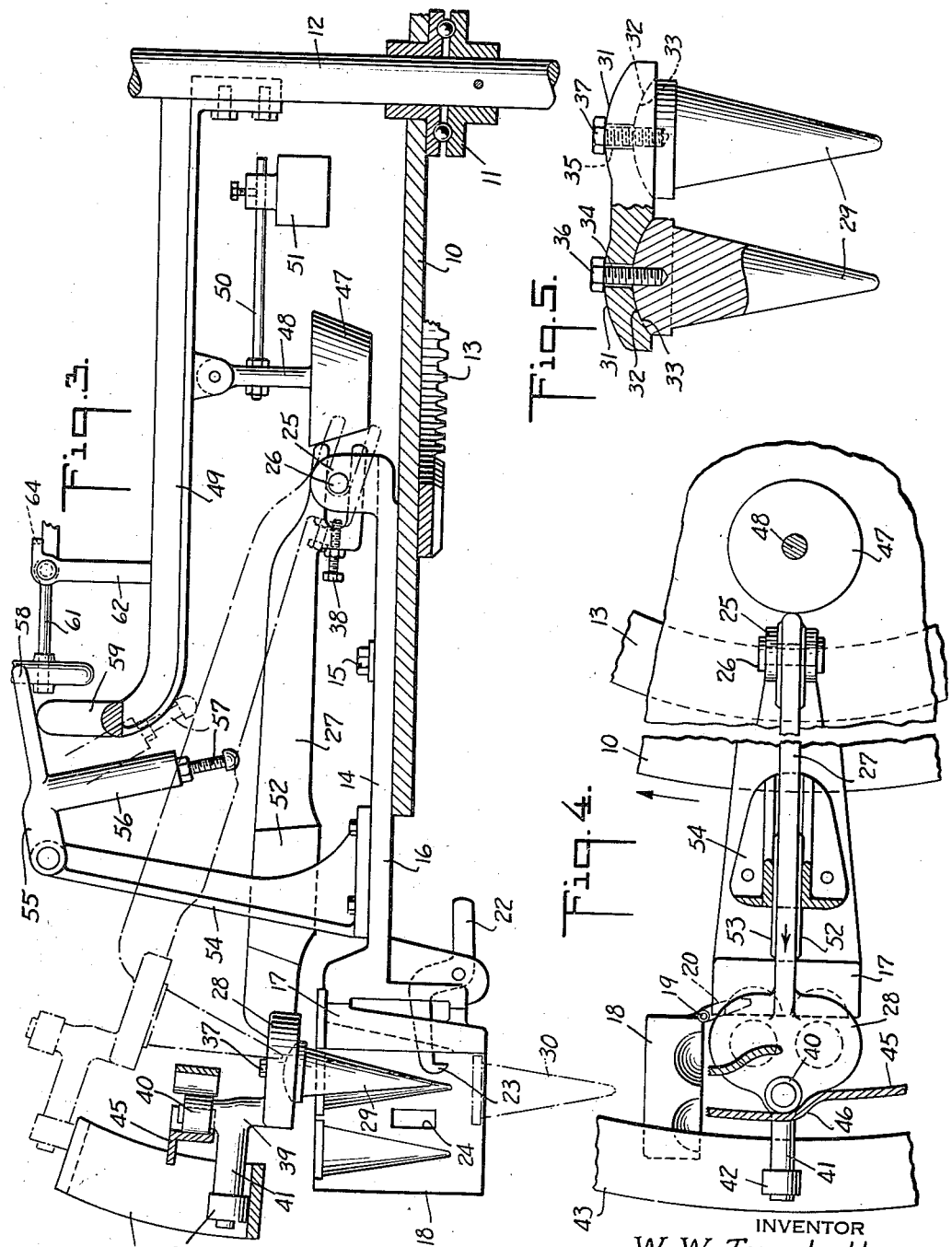
INVENTOR
W. W. Turnbull
BY
Henry J Savage
ATTORNEY Patented Aug. 10, 1937

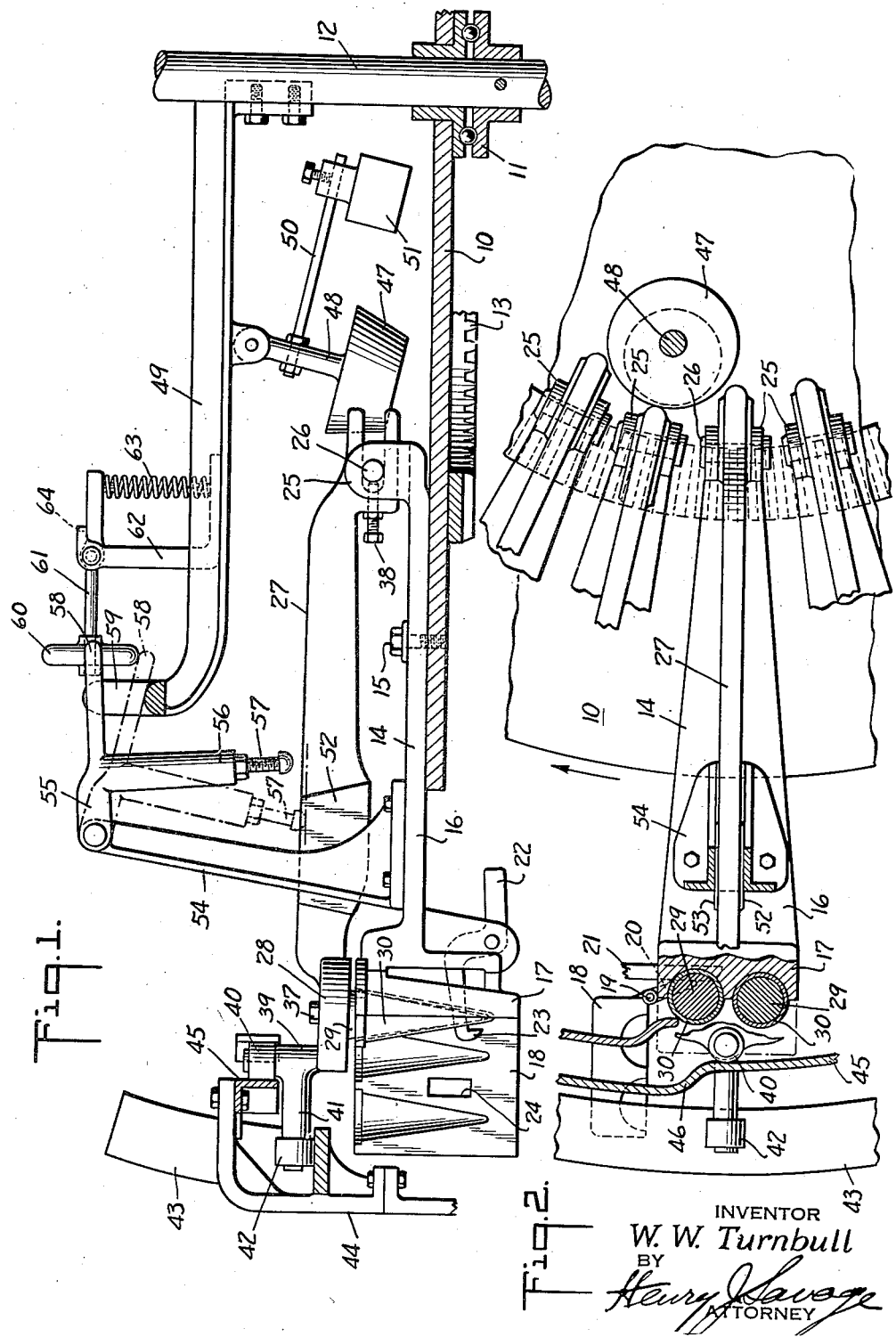

2,089,675

UNITED STATES PATENT OFFICE 2,089,675

CUP PASTRY BAKING MACHINE

Werd W. Turnbull, Chattanooga, Tenn.

Application February 17, 1937, Serial No. 126,129

10 Claims. (Cl. 107—58)

My invention relates to cup pastry baking machines and has for its principal object to improve the molds for forming the pastry cups and the mechanism for operating them to eject the baked articles. Another object is to construct the core carrying head and cores so that the latter can be accurately centered within the cup-forming cavities in the molds.

The above and other objects of the invention are attained by the embodiment thereof that I have illustrated in the accompanying drawings wherein I have shown an ice cream cone baking machine, but the invention is applicable to machines for baking any kind of pastry cups.

Fig. 1 is a side elevation of one mold unit just prior to the ejection of the baked cones, a part of the mold carrying frame or table being shown in section.

Fig. 2 is a top plan view of the same, partly in section.

Figs. 3 and 4 are views similar to Figs. 1 and 2 at the time the baked cones are ejected.

Fig. 5 shows how the cores are attached to the core carrying heads so that they can be accurately centered in the molds.

A rotatable table 10 is mounted on a ball bearing 11 to rotate about a vertical standard 12, the table being rotated through the curved rack 13 which is secured to the underside. The table rotates continuously or step-by-step, as may be preferred, and carries a number of mold units 14, usually 32 or 36 in number, each unit being secured to the table 10 by a cap screw 15. As the table rotates, it carries the mold units around with it so that they pass successively past a batter pump where they receive charges of batter or dough to form the pastry cups, through a baking zone where they are heated by gas burners to bake the cups, and through the discharging zone where the molds are properly actuated to eject the fully baked pastry cups. All of the mold units are successively operated and controlled by the same means in their path of travel around the machine, and since all units are alike, I have illustrated but a single complete one. It will be understood that the units 14 are radially mounted on the table 10 as indicated in Fig. 2 and are close enough together at their outer ends so that there is just sufficient space between them to permit of their operation. Thus all available space is utilized and there are no large open areas to effect heat losses.

Each mold unit 14 consists of a base 16 which has secured at its outer end one half 17 of a female mold section, the other half 18 of the female mold being supported on a hinge 19 so that it can be swung open by contact of the lug 20 with a stationary cam 21. The fixed mold section 17 carries a pivoted latch 22, the nose 23 of which engages through a slot 24 in the hinged section 18 to hold the two sections normally together. The two sections, 17, 18, have mating semi-conical cavities formed in their meeting faces which form conical cavities for shaping the outside of the ice cream cones or other pastry cups that are baked on the machine. The base 16 is narrowed at its inner end and has a pair of upstanding ears 25 in which a pintle 26 is secured to provide a pivot point for the forked end of a core arm 27 which at its outer end has a core head 28 to which the cores 29 for molding the smooth inside of the cones or other pastry cups are attached. The cores 29 must be exactly co-axial with the conical cavities in the female mold sections 17, 18 so that the annular conical spaces in which the cones 30 are baked will be of uniform thickness. To enable this to be done, the core carrying head 28 is formed with spherical surfaces or seats 31, 31 and 32, 32 and the tops of the cores 29 are formed with spherical ends 33, 33 (Fig. 5), each set of the spherical surfaces 31, 32, and 33 being concentric when the cores and heads are assembled. The core-head has bores 34, 35 which loosely fit the cap screws 36, 37 that are screwed into the tops of the cores. This permits the tips of the cores 29 to be shifted in any direction to accurately center them in the mold cavities, after which the cap screws 36, 37 are tightened to hold the cores securely in place. The core arm 27 has a set screw 38 bearing against the pintle 26 by means of which the core head and cores as a whole may be adjusted with respect to the mold cavities.

The core-head 28 has a short vertical arm 39 providing a bearing for the roller 40 and a short horizontal arm 41 on which the roller 42 is rotatably mounted. The roller 42 cooperates with an inclined cam track 43 mounted on a part of the frame 44 of the machine to raise the cores 29 out of and lower them again into the mold cavities at the proper times during the rotation of the machine as a whole, the core arms 27 pivoting about the pintles 26. The roller 40 cooperates with a fixed cam 45 having a rise 46 just at the point where the baked cones are to be discharged so that the core arm and cores can be moved bodily radially outward to free the baked cones from the rear or inner mold section 17, as best shown in Figs. 3 and 4. The core arm is moved outward at this point, (the core arm having first been slightly lifted by cam 43 and the mold section 18 swung open) by pressure of the cam wheel 47 on the slotted end of the core arm 27. This cam wheel 47 rotates on an arm 48 pivotally mounted to swing in a vertical radial plane from a part of the frame 49 supported by the standard 12. The arm 48 carries a horizontal rod 50 on which the weight 51 is adjustably secured so that the pressure of the cam wheel 47 on the ends of the core arms 27 may be adjusted.

The core arm 27 is provided with smooth bosses or bearing surfaces 52, 53 which slide in a vertical slot in the yoke 54 mounted on the base 16. A T-shaped latch 55 is pivoted to the yoke 54 to swing directly over the core arm 27 and one arm 56 has an adjustable abutment screw 57 adapted to bear upon the top of the core arm to lock the cores 29 in the molds during the baking period, as best shown in Fig. 1. The latch or core lock 55 has a finger 58 which engages with an arcuate inclined cam track 59 supported on the frame member 49. This cam track 59 extends in an arc over the core bars 27 at that part of the machine where the cores must be released from the molds, lifted out, batter charged into the molds, and the cores returned. As shown in Figs. 1 and 3, the lock 55 has been tilted so as to raise the screw 57 out of contact with the core arm 27. This permits the core arm and cores to be slightly raised by the track 43 and roller 42 to free them from the inside of the baked cones. It also frees the core arm so that the arm and cores may be moved outward by the cam wheel 47, as shown in Figs. 3 and 4, to eject the baked cones, the roller 40 at this time having cleared the rise 46 of the cam 45. After the cones are ejected, the core arm 27 is raised by the cam 43 to the dotted line position shown in Fig. 3, which also slides the core arm inward so that the screw 38 abuts the pintle 26, or the core arm may be moved inward by the roller 40 bearing on an inwardly turned part of the cam 45 beyond the rise 46. The front mold section 18 is then closed and batter or dough charged into the mold cavities while the cores 29 are in their raised position. The declining side of the cam 43 permits the cores 29 to ride down into the mold cavities, which spreads the batter to fill the annular conical spaces between the cores and mold cavities to form the cones. After settling into the molds, the cores are teetered for a short time to permit the escape of steam, and then locked down by the latch 56 when the finger 58 rides off the cam 59. The finger 58 then engages the locking roller 60 which is rotatable on the arm 61 pivoted to a bracket 62 fixed to the frame 49 to support the roller just beyond the end of the cam track 59. The roller 60 is urged downward by a spring 63 which presses upward on the inner end of arm 61, the downward movement of the roller being limited by the stop 64 on the bracket 62. The parts then remain in this position, that is, with the cores locked in the molds, during the baking operation which occupies about 4/5 of the rotation of the machine as a whole.

While I have shown my improved mold units mounted on a horizontal rotatable table, they may of course be mounted on any suitable carrier such as an endless chain, Ferris wheel or other means that is adapted to carry them successively through their several stages and zones of operation.

Having thus described one form of my invention, what I claim is:

1. In a cup pastry baking machine, the combination of a rotatable carrier; a plurality of mold units mounted thereon; each unit comprising a base secured to the carrier, a core arm mounted at one end for pivotal and sliding movement on the inner end of said base, a mold having a plurality of pastry forming cavities secured to the outer end of said base, said mold being formed in two parts hinged together and adapted to be opened and closed, said core arm having depending cores at its outer end adapted to register with said pastry forming cavities; means cooperating with the outer end of the core arm to swing it about its pivotal connection; and means cooperating with the inner end of the core arm to move it on its sliding connection radially of the carrier.

2. In a cup pastry baking machine, the combination of a stationary support, a carrier rotatably mounted thereon, a cup pastry baking mold supported on said carrier, a core arm having cores cooperating with said mold and supported to slide radially with respect to said carrier, a cam carried by said stationary support and extending into the path of the inner end of said core arm whereby rotation of the carrier will cause the inner end of said core cam to engage said cam and slide said core arm and cores radially outward, and means for sliding said core arm radially inward when it has passed said cam.

3. In a cup pastry baking machine, the combination of a stationary support, a carrier rotatably mounted thereon, a cup pastry baking mold supported on said carrier, a core arm extending radially of the carrier and at its outer end having cores cooperating with said mold, the inner end of the arm being slotted and engaging over a pintle on the carrier whereby the arm has pivotal and sliding movement with respect to the carrier, a rotatable cam mounted on said support and extending into the path of said slotted end, whereby rotation of the carrier will cause said slotted end to engage said cam and be moved radially outward, and means engaging the outer end of said arm to move it radially inward when it has passed beyond said cam.

4. A baking unit for cup pastry comprising in combination, a base, a two part mold secured to one end thereof and having pastry forming cavities therein, a core arm having a pivotal and sliding connection at one end with the other end of said base, said core arm at the other end having depending cores cooperating with said mold cavities and means whereby the core arm may be raised and lowered about its pivotal connection.

5. A baking unit for cup pastry comprising in combination, a base, a two part mold secured to one end thereof and having pastry forming cavities therein, a core arm having a pivotal and sliding connection at one end with the other end of said base, said core arm at the other end having depending cores cooperating with said mold, and a connection between said cores and core arm whereby the cores may be adjusted with respect to said mold cavities.

6. A baking unit for cup pastry comprising in combination, a base, a two part mold secured to one end thereof and having pastry forming cavities therein, a core arm having a pivotal and sliding connection at one end with the other end of said base, said core arm at the other end having depending cores cooperating with said mold, a connection between said cores and core arm whereby the cores may be adjusted with respect to said mold cavities, and means for adjusting said core arm and cores bodily with respect to said mold cavities.

7. A baking unit for cup pastry comprising in combination, a base, a two part mold secured to one end thereof and having pastry forming cavities therein, a pair of upstanding ears at the other end thereof, a horizontal pintle extending through said ears, a core arm having a slotted end fitting over said pintle and having pivotal and sliding movement thereon, the other end of said core arm having spherical seats formed therein, cores having spherical ends engaging said seats and extending into said mold cavities, and means connecting said cores to said arm permitting adjustment of said spherical ends with respect to said spherical seats to center said cores in said cavities.

8. In a pastry baking unit, the combination of a mold having a conical cavity therein, a core arm having a spherical seat formed therein, a conical core having a spherical end engaging said spherical seat and being concentric therewith, said core extending into said conical cavity and spaced from the walls thereof, said spherical seat and end permitting said core to be adjusted to center it in said cavity, and means for securing the core in adjusted position.

9. In a pastry baking unit, the combination of a mold having a conical cavity therein, a core arm having concentric internal and external spherical seats with a bore extending through said seats, a core having a spherical end fitting into said internal seat and concentric therewith, said core extending into said cavity and spaced therefrom, and securing means passing loosely through said bore and bearing on said external seat and engaging in said spherical end, whereby said core may be adjusted to center it in said cavity.

10. In a pastry baking unit, a core carrying arm having a spherical seat on its lower face, a core depending from said arm having a spherical end engaging said spherical seat, said spherical end and seat having a common center lying on the vertical axis of said core, means permitting the spherical end to be adjusted relative to said seat, and means for securing the core in adjusted position, whereby the axis of the core may be adjusted angularly with respect to said core carrying arm.

WERD W. TURNBULL.